United States Patent [19]

Kelly et al.

[11] 4,193,838

[45] Mar. 18, 1980

[54] REMOVAL OF THERMOPLASTIC RESIN COATINGS FROM PAPERBOARD WITH HALOGENATED HYDROCARBON VAPORS

[75] Inventors: Robert J. Kelly, Oakley; J. Frank Valle-Riestra, Walnut Creek, both of Calif.

[73] Assignee: The Dow Chemical Company, Midland, Mich.

[21] Appl. No.: 695,213

[22] Filed: Jun. 11, 1976

Related U.S. Application Data

[63] Continuation-in-part of Ser. No. 567,652, Apr. 11, 1975, abandoned.

[51] Int. Cl.$^2$ ............................................... D21C 5/02
[52] U.S. Cl. .......................................... 162/5; 162/55; 162/57; 134/11; 134/31
[58] Field of Search ....................... 162/57, 63, 5, 55; 134/11, 12, 31, 32; 427/335; 8/135, 142

[56] References Cited

U.S. PATENT DOCUMENTS

| | | | |
|---|---|---|---|
| 2,413,144 | 12/1946 | King | 134/31 |
| 3,253,976 | 5/1966 | Bocci | 162/5 |
| 3,507,742 | 4/1970 | Rice | 162/5 |
| 3,595,741 | 7/1971 | Goss | 162/5 |

*Primary Examiner*—S. Leon Bashore
*Assistant Examiner*—William F. Smith
*Attorney, Agent, or Firm*—R. R. Stringham

[57] ABSTRACT

Paperstock pieces coated with a thermoplastic resin are introduced into and agitated together in a pool of hot, saturated vapors of a liquid, halogenated hydrocarbon capable of wetting the resin. The vapors condense on the resin surface and the resin is loosened and removed by the combined actions of the agitation and of the vapors and condensate.

10 Claims, No Drawings

REMOVAL OF THERMOPLASTIC RESIN COATINGS FROM PAPERBOARD WITH HALOGENATED HYDROCARBON VAPORS

CROSS-REFERENCE TO RELATED APPLICATIONS

This Application is a continuation-in-part of co-pending application Ser. No. 567,652 filed Apr. 11, 1975, now abandoned.

BACKGROUND OF THE INVENTION

Elimination of so-called "hotmelt" coatings from paper mill "broke" and trimmings or from used consumer items, such as milk cartons, frozen food boxes and the like is essential to recycling of the high quality cellulose fibers generally contained in such paperboard.

A number of processes employing various aqueous and nonaqueous solvents, separately or in combination, have been developed for the purpose of removing hotmelt coatings. None of these processes employ vapor pools of non-aqueous solvents. The process presently used commercially is the so-called "Polysolv" process, described in U.S. Pat. No. 3,058,871. This patent constitutes the closest known prior art.

In the latter process, shredded "furnish" is washed with progressively cleaner batches of a super-heated liquid solvent, such as trichloroethylene, in a rotary extractor or autoclave. The denuded furnish is then stripped of residual solvent, in the extractor, with steam. The "dirtiest" solvent is distilled and the bottoms are mixed with fuel oil and further distilled to remove the last of the solvent. The residual polymer/fuel oil mixture is incinerated or utilized as boiler fuel.

U.S. patent application Ser. No. 371,836, published in abstract in the Jan. 28, 1975 Official Gazette as part of a Trial Voluntary Protest Program, is directed to the method of cleaning an article contaminated with organic acid materials so as to form a biodegradeable waste comprising the steps of:

inserting the article to be cleaned of organic acid residues into the vapor section of a vapor degreaser, said vapor degreaser having a two-phase liquid solvent located in the sump thereof, said two-phase liquid solvent comprising a first liquid containing an organic solvent and a second liquid containing water and an inorganic base of low volatility, said inorganic base being sufficiently strong to neutralize said organic acid materials, and said first and second liquids being immiscible in one another; and heating said mixture to boil said two-phase liquid solvent wherein said solvent is in a state of turbulence and a vapor of water and organic solvent is created in said vapor section and refluxing said mixture, without vaporizing said inorganic base.

U.S. Pat. No. 2,413,144 discloses a method of removing waxes from shotgun shells (or other coated paper objects) wherein the shells (or objects) are individually suspended in hot vapors of a suitable solvent. No agitation is employed.

OBJECTS OF THE PRESENT INVENTION

It is a primary object of the present invention to provide a process in which coated paper stock can be completely freed of the coating resin by the flushing action of a hot solvent condensate, i.e., solvent containing no dissolved polymer.

An additional object is to provide a process in which the treated stock or furnish is not subjected to steam-stripping and emerges dry.

A further object is to provide for operation of a hotmelt removal process in such manner that the hotmelt is removed from the furnish largely in the form of a solvent-swollen gel, rather than as a solution in the solvent, thereby facilitating economic recovery of both the resin and the solvent for re-use.

Other objects will be apparent to those skilled in the art.

SUMMARY OF THE INVENTION

Broadly, the present invention is a process for removing a coating resin from paperstock coated therewith, comprising:

(a) maintaining a pool of hot, saturated vapors of a halogenated, acyclic hydrocarbon containing from one to three carbons and from two to eight bromine, chlorine or fluorine atoms, at least two of which are bromine or chlorine, said halogenated hydrocarbon melting at a temperature of 60° or less to form a liquid capable of wetting said resin and said vapors being at a temperature which is at least as high as the melting or softening point of the resin and having a density which is at least three times the density of the ambient air, (b) placing pieces of the coated paperstock, which are at a temperature below the condensation temperature of said vapors, in said vapor pool, thereby causing formation of a continuous, off-running film of condensate on the resin, (c) agitating together said pieces of paperstock in the vapor pool until at least a predominant proportion of said resin has been removed by the combined actions thereon of said agitation and of the vapors and condensate.

In a preferred embodiment of the preceding process (1) said resin is converted to a semi-solid or gel phase as a result of swelling and softening by the hot vapors, (2) the combined actions of the condensate and gravity cause said phase to separate from said paperstock and fall, and (3) said phase is intercepted and recovered essentially free of any of said halogenated hydrocarbon present as a separate liquid phase.

In another preferred embodiment of the invention, as above broadly defined, the halogenated hydrocarbon vapors have a heat of condensation less than 150 BTU/lb.

In a highly preferred embodiment, the only halogen contained in said halogenated hydrocarbon is chlorine.

In the most preferred embodiment of the process, the liquid halogenated hydrocarbon is perchloroethylene.

The preferred application of the process is to hotmelt coated paperboard.

DETAILED DESCRIPTION OF THE INVENTION

Apparatus required for the practice of the present invention is generally as commonly used in conventional vapor degreasing operations, such as removing grease from metal parts, for example. Modifications, such as inclusion of means for intercepting resins removed as a gel, for example, may be readily made and require only ordinary skill in the art of chemical engineering.

A typical, commercial operation employing the process of the invention will involve the following steps:

(1) Shredding of the coated paperstock into strips of a width and length appropriate to the apparatus selected.

(2) Agitating together the strips while exposing them to the hot, saturated, halogenated hydrocarbon vapors until a desired proportion of the coating has been removed by the combined actions of the vapors, the condensate and gravity. Usually, the shredded stock will be kept in the vapors at least until condensation on the shreds no longer occurs, resulting in essentially complete removal of the solvent-wettable coating resin. For example, from 15 seconds to 2 minutes usually suffices when ordinary hot-melt coated paperboard is immersed in hot vapors of perchloroethylene.

(3) Interception or separation of any resinous materials flushed from the paperstock by the condensate as a discrete phase, such as a solution gel or a melt.

(4) A final rinse of the "degreased" furnish with clean liquid solvent (usually the same as the solvent of which the hot vapor pool consists but optionally a different solvent). This step may often be omitted.

(5) Removal of any residual solvent entrained in the stripped paperstock.

(6) Recovery of any dissolved resins carried into the liquid solvent sump by the condensate, as, for example, by continually removing a bleed which is distilled (by which means any water present is also removed, usually as a lower boiling azeotrope). The resin is recovered as a bottoms product. Alternatively, dissolved resin may be separated by chilling and centrifuging or filtering or by other conventional separatory procedures.

(7) Recycle of the recovered, water-free solvent (a convenient source of rinse-solvent for step (4)).

Suitable coated paperstock feed for the present process is any paperstock which can be sized for the available equipment and which is coated with a resin upon which hot vapors of a halogenated hydrocarbon will condense to form a film of liquid capable, in concert with uncondensed hot vapors, of loosening and flushing off the resin. Thus, the term "paperstock" as used herein has a broader connotation than "paperboard" and denotes any substrate consisting predominantly of entangled or woven cellulosic fibers, including materials which would ordinarily be considered fabrics. However, the importance of the process resides primarily in its application to paperboards.

Whether or not a given liquid halogenated hydrocarbon wets a given coating resin can be determined precisely by wetting angle measurements in well-known procedures. However, adequacy of wetting can usually be judged quite satisfactorily by eye. If a liquid appears to wet the resin only poorly, i.e., will not spread out as a continuous film but tends to retract or remain as film-like islands or discrete drops, an empirical laboratory test of the "degreasing" procedure itself may be resorted to. This will usually be unnecessary. As a general guide, the less polar halogenated hydrocarbon solvents will be expected to more readily wet coating surfaces having a low degree of polar character, such as polyolefins, poly fluoro-olefins, etc. Coatings of more polar polymers, such as nylons, polyesters, Sarans, polyacrylic acids and sulfonated polyvinyl aromatics will be expected to be wet more readily by the more polar of the specified halogenated hydrocarbons.

The term "liquid" as used herein with regard to halogenated hydrocarbons is intended to include such materials which melt at temperatures of about 60° C., or less, although solvents which are liquid at ordinary ambient temperatures are distinctly preferred.

The invention is not predicated on details of mechanism. Resin loosening may be due partly or wholly to swelling by imbibed vapors or to softening, melting or actual dissolution. Preferably, however, a solvent is chosen which is capable of removing the resin as a discrete, readily separable semi-solid or gel as a result of swelling and softening by the hot vapors and by the mechanical flushing action of the condensate. It is a simple matter to determine whether any given solvent will function this way with a given coated stock, even if the type of coating resin is not known. A procedure and laboratory apparatus suitable for this purpose is described in Example 1 herein.

In general, coating resins consist of inexpensive, readily available thermoplastics, such as polyethylene or ethylene/propylene copolymers. However, the process of the invention may be employed to advantage with any type of resin which can be loosened from and flushed off a paperlike substrate by the combined actions of the vapor pool and the resultant condensate (under the influence of a gravitational force).

Suitable halogenated hydrocarbons

Suitable halogenated acyclic hydrocarbons are methanes, ethanes, ethylene, propanes or propylenes substituted with from two to eight bromines, chlorines or fluorines, at least two of which are bromine or chlorine. The compound (or mixture of such compounds) should melt at about 60° C. or less and the vapor density must be at least three times the density of the ambient air.

It is also essential that the liquid is capable of wetting the resin to be removed and boils at or above a temperature at which softening or melting of the resin occurs. It should be noted that the term softening, as used herein, includes any softening effect due to imbibing of solvent by the resin structure. Thus, a resin may exhibit softening in a hot vapor pool at a temperature lower than its "softening point" as ordinarly defined.

Although solvents suitable for the process can be used to form vapor pools at temperatures above or below their normal atmospheric boiling points, by resort to super- or sub-atmospheric pressures, operation at ordinary, ambient pressures is highly preferable, even in closed systems.

Many coated paperstocks will include water in the cellulosic substrate which will be volatilized by the action of the hot vapors or condensate. Accordingly, such stabilizers as may be required to at least minimize the concentration of hydrolysis products in the halogenated hydrocarbon solvent will usually be employed. The process is generally operable for its intended purpose in the absence of such stabilizers, but for reasons of economy and safety, their use is to be recommended. A wide variety of stabilizers for halogenated hydrocarbon solvents are known. The majority of these are various combinations of nitrogen bases, such as amines, with oxirane compounds, butylene oxide, for example. Proprietary formulations for commercial degreasing operations, such as the several stabilized perchloroethylene formulations marketed by The Dow Chemical Company, are particularly suitable.

The lower the heat of condensation of a given solvent, the greater the amount of condensate which will result from the cooling action attendant upon placing a given quantity of coated paperstock in a vapor pool. The sensible heat of coated paperstock is usually relatively low and precooling or chilling of it will ordinarily not be practical. Consequently, it is important to condensation of a sufficient quantity of the solvent vapors for good flushing action that the latent heat of condensation be as low as possible. Desirably, this will be below 150 BTU/lb. and preferably less than 100 BTU/lb.

To be suitable for the present process, the hot vapors must have a relative vapor density of at least 3. Otherwise, a "pool" of the saturated, hot vapors cannot be established as a body of vapors defined by peripheral cooling means, even in a closed system, and excessive losses of the solvent will occur in an open system. This requirement is well known in the general art of vapor degreasing.

Table I, following, gives boiling points (B. pt.), latent heats of vaporization (=heat of condensation) and relative vapor densities for several chlorinated hydrocarbon solvents. With the exception of methylene chloride and 1,2-dichloroethane, these solvents are well adapted for the practice of the present invention at ordinary ambient pressures.

TABLE 1

CHLORINATED $C_1$–$C_2$ HYDROCARBON PROPERTIES

| Solvent | Boiling Point °C. | Latent Heat BTU/lb | Relative Vapor Density at B. Pt. |
|---|---|---|---|
| Methylene Chloride | 40.0 | 141.7 | 2.76 |
| Chloroform | 61.2 | 106.2 | 3.64 |
| Carbon tetrachloride | 76.8 | 93.8 | 4.48 |
| 1,2-Dichloroethane | 83.5 | 139.1 | 2.82 |
| 1,1,1-Trichloroethane | 74.0 | 102.0 | 3.91 |
| Trichloroethylene | 86.9 | 101.6 | 3.57 |
| Perchloroethylene | 121.0 | 90.2 | 4.28 |

Various data sources, such as the International Critical Tables, handbooks, manufacturers brochures, etc., may be consulted for melting points, boiling points, latent heats and vapor densities of other halogenated hydrocarbons. In addition, such constants may be determined by well known physical-chemical methods, such as, for example, the classic methods of Regnault and Victor Meyer for determining vapor densities.

If a particular solvent is found able to convert a given coating resin to a semi-solid or gel which falls off the paperstock as a discrete phase which can be intercepted and thereby kept from dissolving in any liquid body of the solvent into which it would otherwise fall, that solvent will generally be highly preferred for removal of the resin.

A representative list of halogenated $C_1$–$C_3$ hydrocarbons and their boiling points follows. Melting points are also given for compounds which are not liquids at ordinary ambient temperatures. Those compounds marked with asterisks would generally be impractical for use in the present process.

TABLE II

| | | Boiling point |
|---|---|---|
| Methanes | | |
| Bromo, chloro- | | 69° C./760 mm Hg |
| Dibromo- | | 97 |
| Bromo, chloro, fluoro- | | 36.1 |
| Bromo, dichloro- | | 80–90°/742 mm |
| Dibromo, fluoro- | | 64.9°/757 mm |
| Dibromo, chloro- | | 118–20°/748 mm |
| Tribromo- | | 149.5°/760 mm |
| Bromo, trichloro- | | 104 |
| Tribromo, fluoro- | | 106 |
| Tribromo, chloro- | mp 55° | 158–9° |
| Ethylenes | | |
| 1,2-Dichloro- | cis | 60.3/760 mm |
| | trans | 47.5 |
| 1,2-Dibromo- | cis | 112.5 |
| | trans | 108 |
| Tribromo- | | 163.4 |
| Ethanes | | |
| 1-Bromo- | | 38.4/760 mm |
| 1-Chloro-2-fluoro- | | 53.2 |
| 1-Bromo-2-fluoro- | | 70.1/745 |
| 1-Bromo-2-chloro- | | 107/760 mm |
| 1,1-Dibromo- | | 110 |
| 1,2-Dibromo- | | 131 |
| 1,1,2-Trichloro- | | 113 |
| 1,1,2-Tribromo- | | 187–90 |
| 2-Bromo-1,1,1-trichloro | | 129–30 |
| 1,2-Dibromo-1,1-dichloro- | | 176–8 (decomposes) |
| 1,2-Dibromo-1,2-dichloro- | | 195 |
| 1,1,2,2-Tetrabromo- | | 239–42 (decomposes) 137–8/36 |
| Pentachloro- | | 162 |
| 1,1,1-Trichloro-2,2,2-trifluoro- | | 45.8 |
| 1,1,2-Trichloro-1,2,2-trifluoro- | | 47.7 |
| 1,1-Difluoro-1,2,2,2-tetrachloro | mp 40.6° | 91.5 |
| 1,2-Difluoro-1,1,2,2-tetrachloro | 25 | 93 |
| * Fluoro, pentachloro- | 101 | 134–6 |
| * Hexachloro- | 187 | 186/777 |
| Propylenes | | |
| 1-Chloro- | cis | 32.8/760 mm |
| | trans | 37.4 |
| 3-Chloro- | | 45 |
| 1-Bromo- | | 58–60/747 mm |
| 2-Bromo- | | 48.4/760 |
| 3-Bromo- | | 70 |
| 1,1-Dichloro- | | 78 |
| 1,3-Dichloro- | cis | 112 |
| | trans | 104.3 |
| 3,3-Dichloro- | | 84.4 |
| 2,3-Dibromo | | 139–40 |
| 1,1,2-Trichloro- | | 118 |
| 1,2,3-Trichloro- | | 142 |
| Propanes | | |
| 1-Bromo- | | 70.8 |
| 1,1-Dichloro- | | 88.3 |
| 1,2-Dichloro- | | 96.2 |
| 1,3-Dichloro- | | 120.4 |
| 2,2-Dichloro- | | 69.7 |
| 1-Chloro-3-fluoro- | | 82.5 |
| 1-Bromo-3-fluoro- | | 101.4 |
| 1-Bromo-2-chloro- | | 118 |
| 1-Bromo-3-chloro- | | 141.3–2.3 |
| 2-Bromo-1-chloro- | | 117 |
| 1,2-Dibromo- | | 141.4 |
| 1,3-Dibromo- | | 167.3 |
| 1,1,1-Trichloro- | | 106.5–8.5 |
| 1,2,3-Tribromo- | | 219.2 |
| 1,1,1,2-Tetrachloro- | | 152–3 |
| 1,2,2,3-Tetrachloro- | | 164° |
| * 1,1,1,2,3-Pentachloro- | mp 179–80 | sublimes |
| 1,1,2,3,3-Pentachloro- | | 198–200 |
| 1,1,1,2,3,3,3-Heptachloro- | | 249 |
| 1,1,1,2,2,3,3-Heptachloro- | 29.4 | 247–8 |
| * Octachloro- | 160 | 268–9/734 mm |

It is apparent from the data in Table II that $C_2$–$C_3$ hydrocarbons which are substituted with more than about four to five bromine or chlorine atoms tend, with some exceptions, to be so high melting as to be generally not practicable for use in the present process. On the other hand, 1,1,1,2,2,3-hexafluoropropane (not included in the table) boils at 1.2° C. Thus, substitution with a total of up to eight halogen atoms does not render a $C_2$-$C_3$ hydrocarbon unsuitable for the present process if the additional halogens above about four are fluorines. In general, however, the higher the relative content of bromine and/or chlorine, vis-a-vis, hydrogen or fluorine, the higher will be the vapor density. Since chlorinated hydrocarbons tend to have lower latent heats of vaporization than comparable brominated hydrocarbons, the halogenated, acyclic $C_1$-$C_3$ hydrocarbons in which chlorine is the only halogen present are preferred.

It is to be noted that one of the heptachloropropanes is a high boiling liquid which should be suitable for removal of resins which soften, melt or dissolve at temperatures of 249° or less. Ordinarily, however, much lower temperatures, less conducive to fiber damage, will be preferred. Vapor temperatures in the range of about 100°–160° are considered optimum for removal of conventional hotmelt coatings.

Perchloroethylene is a particularly preferred solvent, not only because it is commercially available in stabilized formulations and is of proven utility in degreasing operations, but for other reasons as well. The following advantages may be noted:

1. The boiling point (121°/760 mm) of perchloroethylene is high enough to melt most hotmelt waxes. In contrast, methyl chloroform is not as effective in rapidly stripping hotmelt coatings because the coating must be dissolved in order to effect debonding thereof; that is, methyl chloroform has too low a boiling point to be very efficient;
2. Perchloroethylene is a relatively poor solvent for polymeric hotmelts, thereby facilitating their recovery as a discrete second phase, such as a gel;
3. The boiling point of perchloroethylene is low enough not to deleteriously affect the structure and physical properties of the cellulose fibers. Measurable properties of handsheets made from repulped fibers, such as freeness, burst factor and brightness, are unaffected by contact with this solvent;
4. It has a very low heat of vaporization, the importance of which is explained above.

EXAMPLES

Laboratory degreaser

A laboratory degreaser was made from a stainless steel beaker about 8" in diameter and about 12" in height. A disc of 60-mesh, stainless steel screening, about 6" in diameter, was fastened to three stainless steel, 3/16" legs about 2" long and placed in the bottom of the beaker. A cylindrical cage, about 3" in diameter and 6" long and having a hinged door which could be fastened shut, was made from stainless steel, ½" mesh screening and closed at each end with a stainless steel plate 3" in diameter. An axle rod, about ⅜" in diameter and 1" long, was fastened to the center of each end plate and two semicylindrical bearing troughs were mounted diametrically opposite each other on the interior surface of the beaker at a height of about 6". The cage and axle assembly could be rotated freely (with a push rod) when positioned with the axle ends in the bearings. Several coils of ¼" copper tubing were wound around the outside of the beaker, to provide water-cooling. The middle coil was positioned at a height of about 8½". The unit was placed on a hot-plate having a controllable heat input and the halogenated hydrocarbon (perchloroethylene) poured in to form a "sump" layer about 1" deep at the bottom of the beaker. "Degreasing" operations were carried out in a hood having a sufficient air velocity to prevent escape therefrom of solvent vapors.

EXAMPLE 1—Hot-melt Stripping

Heat and cooling inputs were controlled to establish a "pool" of saturated perchloroethylene vapors having a maximum height of about 9" and a temperature of about 121°. The cage was charged with about 60 grams of post-consumer milk carton stock (polyethylene-coated, bleached, Kraft paperboard which had been cut into strips averaging about 1"×4" in size). The cage was placed on the bearings and rotated at a rate of about ½ revolution per second. Condensation of vapors on the strips and run-off of the resulting condensate started immediately upon contact of the strips with the vapors. The coating rapidly separated into large drops or blobs and was flushed off (with associated pigments) in about 10-15 seconds. After a total of about one minute no liquid was forming on the strips and it was observed that portions of the strips which had been selected together with hotmelt were separated from each other. It was apparent that contact between the strips due to the agitation (tumbling action in the rotating cage) was essential to the latter result. The cage and 60 mesh screen were removed from the beaker.

The paperboard in the cage was found entirely free of the hotmelt coating, pigments and residual solvent. The screen was found to have intercepted a quantity of a gel, of which about 85% was liquid perchloroethylene. The weight of the paper immediately after the vapor treatment was 54 grams. A total of 2.4 grams of resin (4% of the furnish weight) was recovered. The resin in the gel intercepted by the screen accounted for 70 wt. % of the latter recovery. The remaining weight loss was due to water vaporized from the paper; most of this loss was gained back when the paper was allowed to equilibrate with the ambient air.

The preceding results make apparent the utility of the process of the invention for debonding and removing an adhered, solvent-wettable resin from a cellulosic substrate.

EXAMPLE 2—Solvent and Hot-melt Recovery

A 1% solution of a polyethylene hotmelt formulation in perchloroethylene was subjected to atmospheric distillation. The apparatus consisted of a glass round bottom flask heated with an electric mantle and the usual assembly of thermometers and overhead condenser; no fractionation plates were provided.

The boiling temperature remained indistinguishable from that of the pure solvent (121° C.) until the concentration reached 5% (by weight). The temperature then rose slowly to 150° C. at 33% concentration and more rapidly to 165° C., at which time the distillation was terminated. The residue was a yellowish brown, viscous fluid with no tendency to cling to the glass walls at the terminal temperature. After rapid quenching, the residue analyzed for 1% perchloroethylene by weight. Gas chromatographic analysis of the distillate revealed no contamination of the solvent by hotmelt components.

EXAMPLE 3—Removal of Other Coating Materials

In similar tests to that of Example 1, the present process has been found effective for rapid removal of STYROFOAM® fillers from paperboard substrates. Alsphalt coatings are also removed readily on exposure to hot halogenated hydrocarbon vapors.

In accordance with common practice in degreasing operations wherein an article is moved through a hot vapor pool, as on a conveyor, it is critically important to control the rate of movement such that no gross disturbance of the air/vapor interface results. A rate of no more than 10 ft. per minute is recommended for typical results. A rate of no more than 10 ft. per minute is recommended for typical operations. No lower limit on rate of motion, other than is imposed by economic considerations, prevails.

It is essential to ensure that the pieces of paperstock are agitated together (and against the walls of any container they are in) in order to attain efficient removal of their resin coating by the action of the solvent vapors and/or condensate film.

It is not necessary that the body of boiling solvent from which the vapor pool is derived be located under the pool, although this will ordinarily be preferable.

The foregoing examples are only for purposes of illustration and are not to be construed as limiting the scope of the present invention other than according to the claims appended herewith.

We claim:

1. A process for removing a coating resin from paperstock coated therewith, comprising:
   (a) maintaining a pool of hot, saturated vapors of a halogenated, acyclic hydrocarbon containing from one to three carbons and from two to eight bromine, chlorine or fluorine atoms, at least two of which are bromine or chlorine,
   said halogenated hydrocarbon melting at a temperature of 60° C. or less to form a liquid capable of wetting said resin and said vapors being at a temperature which is at least as high as the melting or softening point of the resin and having a density which is at least three times the density of the ambient air,
   (b) placing pieces of the coated paperstock, which are at a temperature below the condensation temperature of said vapors, in said vapor pool, thereby causing formation of a continuous, off-running film of condensate on the resin,
   (c) agitating together said pieces of paperstock in the vapor pool until at least a predominant proportion of said resin has been removed by the combined actions thereon of said agitation and of the vapors and condensate.

2. The process of claim 1 in which
   (1) said resin is converted to a semi-solid or gel phase as a result of swelling and softening by the hot vapors,
   (2) the combined actions of the condensate and gravity cause said phase to separate from said paperstock and fall, and
   (3) said phase is intercepted and recovered, essentially free of any of said halogenated hydrocarbon present as a separate liquid phase.

3. The process of claim 1 in which the latent heat of condensation of said vapors is less than 150 BTU/lb.

4. The process of claim 1 in which the only halogen in said halogenated hydrocarbon is chlorine.

5. The process of claim 4 in which said halogenated hydrocarbon is perchloroethylene.

6. The process of claim 1 in which said paperstock is hotmelt coated paperboard.

7. The process of claim 2 in which said resin is polyethylene, said halogenated hydrocarbon is perchloroethylene and said second phase is a gel of said resin swollen with perchloroethylene.

8. The process of claim 1 wherein said paperstock is kept in said vapor pool until condensation of the vapors thereon no longer occurs.

9. The process of claim 7 in which said gel consists of about 85 weight percent perchloroethylene and about 15 weight percent polyethylene.

10. The process of claim 1 in which said paperstock is coated with foamed polystyrene or with asphalt.

* * * * *

UNITED STATES PATENT AND TRADEMARK OFFICE
CERTIFICATE OF CORRECTION

PATENT NO. : 4,193,838

DATED : March 18, 1980

INVENTOR(S) : Robert J. Kelly; J. Frank Valle-Riestra

It is certified that error appears in the above-identified patent and that said Letters Patent are hereby corrected as shown below:

```
Column 3, line 23, delete "solution" and insert
     -- swollen -- ;

Column 8, line 26, delete "selected" and insert
     -- sealed -- ;

Column 9, lines 14 and 15, delete line 14 after
     the word "typical" up to but not including
     the word "operations" in line 15.
```

Signed and Sealed this

Twenty-ninth Day of July 1980

[SEAL]

Attest:

SIDNEY A. DIAMOND

Attesting Officer

Commissioner of Patents and Trademarks